(12) United States Patent
Nishimagi et al.

(10) Patent No.: US 11,618,221 B2
(45) Date of Patent: Apr. 4, 2023

(54) ADDITIVE FOR LASER-MARKABLE AND LASER-WELDABLE POLYMER MATERIALS

(71) Applicant: Merck Patent GmbH, Darmstadt (DE)

(72) Inventors: Atsuko Nishimagi, Iwaki (JP); Kazuhisa Azuma, Fukushima (JP); Ryuta Suzuki, Iwaki (JP)

(73) Assignee: Merck Patent GmbH, Darmstadt (DE)

( * ) Notice: Subject to any disclaimer, the term of this patent is extended or adjusted under 35 U.S.C. 154(b) by 964 days.

(21) Appl. No.: 16/461,878

(22) PCT Filed: Nov. 20, 2017

(86) PCT No.: PCT/EP2017/079705
§ 371 (c)(1),
(2) Date: May 17, 2019

(87) PCT Pub. No.: WO2018/095834
PCT Pub. Date: May 31, 2018

(65) Prior Publication Data
US 2019/0351622 A1 Nov. 21, 2019

(30) Foreign Application Priority Data
Nov. 22, 2016 (EP) .................................. 16199997

(51) Int. Cl.
| | | |
|---|---|---|
| *B29C 65/16* | (2006.01) | |
| *B41M 5/26* | (2006.01) | |
| *C08K 3/22* | (2006.01) | |
| *C08K 9/02* | (2006.01) | |
| *C08L 101/00* | (2006.01) | |

(52) U.S. Cl.
CPC ......... *B29C 65/1635* (2013.01); *B41M 5/267* (2013.01); *C08K 3/22* (2013.01); *C08K 9/02* (2013.01); *C08L 101/00* (2013.01); *C08K 2003/2241* (2013.01)

(58) Field of Classification Search
None
See application file for complete search history.

(56) References Cited

U.S. PATENT DOCUMENTS

| | | | |
|---|---|---|---|
| 5,422,383 A | 6/1995 | Takahashi et al. | |
| 5,578,120 A | 11/1996 | Takahashi et al. | |
| 5,731,119 A | 3/1998 | Eichorst et al. | |
| 5,945,035 A * | 8/1999 | Vogt .................. | H01B 1/20 423/71 |
| 6,693,657 B2 | 2/2004 | Carroll, Jr. et al. | |
| 8,778,494 B2 | 7/2014 | Edler et al. | |
| 9,890,287 B2 | 2/2018 | Kniess et al. | |
| 2003/0012902 A1 | 1/2003 | Kim et al. | |
| 2007/0173581 A1 | 7/2007 | Hager et al. | |
| 2010/0092700 A1 | 4/2010 | Carroll et al. | |
| 2012/0010345 A1 | 1/2012 | Edler et al. | |
| 2016/0099088 A1 * | 4/2016 | Adamchuk ............ | H01B 3/002 524/544 |

FOREIGN PATENT DOCUMENTS

| | | |
|---|---|---|
| CN | 105916812 A | 8/2016 |
| EP | 0841590 A1 | 5/1998 |
| EP | 1720712 B1 | 9/2008 |
| EP | 1377522 B1 | 6/2010 |
| JP | 7025154 A | 1/1995 |
| JP | 10142737 A | 5/1998 |
| JP | 2012007024 A | 1/2012 |
| JP | 4950651 B2 | 6/2012 |
| JP | 2012520905 A | 9/2012 |
| JP | 5054330 B2 | 10/2012 |
| JP | 2015224170 A | 12/2015 |
| WO | 10011227 A1 | 1/2010 |
| WO | 10045274 A1 | 4/2010 |
| WO | 12104006 A1 | 8/2012 |

OTHER PUBLICATIONS

Search Report in corresponding ROC (Taiwan) Patent Application No. 106140205 dated Apr. 21, 2021 (pp. 1-5).
International Search Report PCT/EP2017/079705 dated Feb. 9, 2018 (-pp. 1-3).
English translaton of Notification of reasons for Refusal in corresponding JP appln: 2019-527464 Dispatched Oct. 26, 2021 (1-5 pages).

* cited by examiner

*Primary Examiner* — Robert T Butcher
(74) *Attorney, Agent, or Firm* — Millen, White, Zelano and Branigan, P.C.; Harry B. Shubin

(57) ABSTRACT

The present invention relates to an additive for laser-markable and/or laser-weldable polymer materials, and in particular to the use of pigments which comprise niobium-doped titanium dioxide as laser absorbing additive in polymer materials, to polymer materials which comprise a laser absorbing additive of this type and to a laser-marked or laser-welded product comprising at least one polymer material and niobium-doped titanium dioxide containing pigments as laser absorbing additive.

12 Claims, No Drawings

ADDITIVE FOR LASER-MARKABLE AND LASER-WELDABLE POLYMER MATERIALS

The present invention relates to an additive for laser-markable and laser-weldable polymer materials, and in particular to the use of pigments which comprise niobium-doped titanium dioxide as laser absorbing additive in polymer materials, to polymer materials which comprise a laser absorbing additive of this type and to a laser-marked or laser-welded product comprising at least one polymer material and niobium-doped titanium dioxide containing pigments as laser absorbing additive.

The labelling of manufactured goods is a standard procedure in virtually all branches of industry. Frequently, product information details such as dates of manufacture, batch numbers, serial numbers, barcodes, 2D codes, company logos or expiry dates have to be applied to plastic articles. To this end, contactless, very rapid as well as flexible marking technologies are preferred, such as laser marking procedures. Using this technology it is possible to apply inscriptions in polymeric parts or objects at high speed, even to a non-planar surface. Since an inscription produced this way is located in the plastic body itself, it is permanently resistant to abrasion.

Since many plastics are transparent to laser light, laser sensitive agents which cause a local, highly visible discoloration in the plastic material are usually added to the plastics. The discoloration in the plastic may be produced either directly as a result of interaction of the laser light with the polymer or indirectly as a result of interaction of the laser light with the laser-absorbing additive. The laser-sensitive additive can be an organic dye or a pigment which absorbs the laser light. Various causes may be given for the discoloration, for example, the decomposition of the polymer or the conversion of the laser-absorbing additive itself from an invisible form to a visible form. A darkening in the color of the plastic generally occurs due to carbonisation as a consequence of the laser energy introduced.

Numerous additives are known for the laser marking of plastics. Suitable materials for laser-marking using Nd-YAG lasers (neodymium doped yttrium aluminium garnet lasers), YVO4 lasers (yttrium vanadate lasers) and 1064 nm fibre lasers are preferably those which absorb light of wavelength 1064 nm and themselves have only a slight intrinsic color. Examples are copper phosphates, bismuth oxide, bismuth oxychloride, antimony-doped tin oxide, antimony-doped tin oxide on substrates, antimony trioxide, fluorine doped tin oxide, indium doped tin oxide or metals.

For example, EP 1377522 A2 describes additives for laser-marking of plastics which consist of a calcined antimony/tin mixed oxide in which the antimony concentration at the surface is greater than that in the particles as a whole. The particle size is 0.1-10 μm, preferably 0.5-5 μm. With such an additive, dark markings on pale backgrounds are obtained.

In EP 1720712 A1 highly transparent laser-markable and laser-weldable plastic materials which comprise doped tin oxides, antimony oxides or indium oxides with particle sizes of 1-100 nm are described, which lead to highly transparent plastic parts. The markings obtained here are dark.

A laser additive which is often used is composed of or contains antimony-doped tin oxide, the latter in particular on a mica substrate. Antimony doped tin oxide absorbs laser light quite well, exhibits only a slight greyish color itself and leads to dark markings in plastic materials, but the dark markings have a brownish tinge rather than being blackish. In addition, antimony as a dopant is subject to administration restrictions in some countries, since environmental damage and health problems thereby are feared, which could occur, in particular, during the preparation or recycling of the corresponding compounds or components comprising it.

There were therefore numerous attempts to avoid antimony as a dopant in laser-absorbing additives. Titanium dioxide is a material which is antimony free and not harmful to neither environment nor health. The material is able to absorb laser light and leads to markings in plastics when used as laser-absorbing additive, but the laser sensitivity is not strong enough to give dark markings of high contrast in different plastic materials and under different laser marking conditions.

There was therefore still a need for light or colored plastics which are laser-markable and/or laser weldable, where the laser-absorbing additives contained therein induce sharp and dark laser markings by laser action not exhibiting a brownish tinge under various laser marking conditions and where environmental or health damages are not expected by using these laser-absorbing additives.

Thus, the object of the present invention is to provide a laser sensitive, i.e. a laser absorbing additive for polymer materials which are supposed to be laser-marked or laser-welded when in form of an article containing the polymer material, where the laser absorbing additive enables the creation of sharp dark bluish to blackish laser markings with excellent contrast and/or the easy laser welding of these polymer materials and does not contain dopant materials which might be harmful for health and/or environment of people.

Furthermore, the object of the present invention is to provide a polymer composition having a laser absorber additive therein, where the laser absorber enables the creation of sharp dark bluish to blackish laser markings with excellent contrast and/or the easy laser welding of these polymer materials and does not contain dopant materials which might be harmful for health and/or environment of people.

In addition, a further object of the present invention is to provide articles comprising a polymer composition which might be easily laser-marked or laser-welded and, if laser-marked, exhibit sharp black or blackish laser markings on their surface and which do not contain dopant materials which might be harmful for health and/or environment of people.

Surprisingly, the present inventors have found that niobium-doped titanium dioxide is capable of fulfilling the required characteristics when used as laser absorbing material in a polymer material.

Particles which contain niobium-doped titanium dioxide are know per se. In JP 4950651 B, a resin composition is disclosed which contains particles of niobium-doped titanium dioxide, which are distributed in the resin. The resin is used in an interlayer in glass laminates in order to shield incident solar radiation to some extent.

In JP 5054330 B, a granular conductive particle powder is disclosed which is composed of a core particle having an electrically conductive layer thereon, wherein the conductive layer is composed of niobium-doped titanium dioxide. The conductive particles are used in conductive inks and paints as well as for conductive films made by using the inks and paints.

In U.S. Pat. No. 5,945,035, electrically conductive pigments are described, which have a conductive layer on a platelet-shaped or needle-shaped substrate, wherein the conductive layer may be composed of niobium- and/or tantalum-doped titanium dioxide. The pigments are pale, opaque, decorative pigments having a high electrical conductivity.

The use of niobium-doped titanium dioxide containing pigments as laser absorber in polymeric materials was not known heretofore.

The present invention thus relates to the use of pigments which comprise titanium dioxide as laser absorbing additive in a polymer composition, whereby the titanium dioxide is doped with niobium.

Furthermore, the present invention relates to a polymer composition, comprising at least one polymer compound and a laser absorber, where the laser absorber comprises pigments which comprise niobium-doped titanium dioxide.

In addition, the present invention relates to a laser-markable and/or laser-weldable article consisting of a corpus having a surface, whereby the corpus is composed of a polymer composition as described above or comprises such a polymer composition at least at a part of its surface.

The present invention, in a first aspect, relates to the use of pigments which comprise niobium-doped titanium dioxide as laser absorbing additive in a polymer composition.

The niobium-doped titanium dioxide used as laser absorbing additive according to the present invention is applied in the corresponding polymer composition in the form of a solid particle. Solid particles, which are not soluble in the corresponding application medium are also named pigments. Thus, the laser absorbing additive of the present invention is a laser sensitive pigment.

The niobium-doped titanium dioxide containing pigment used in the present invention may be entirely composed (consist) of niobium-doped titanium dioxide or may contain the latter to a percentage of at least 10% by weight, based on the weight of the entire pigment. In the latter case, the corresponding pigment may consist of a substrate particle bearing a coating thereon which advantageously envelops the substrate or may consist of a particle comprising the niobium-doped titanium dioxide in an intimate mixture with another material which might be a laser absorbing material as well.

In a first embodiment, which is preferred, the pigment used as laser absorbing additive according to the present invention consists of niobium-doped titanium dioxide. Pigments of this type may exhibit any shape and are provided, for example, in a spherical, spheroidal or in an irregular granular shape. These pigments have particle sizes in the range of from 0.01 to 100 µm, in particular of from 0.05 to 80 µm. The $d_5$-value (5 volume percent of the particles are equal or smaller than the given value) is preferably in the range of from 0.1 to 0.5 µm, whereas the $d_{80}$ value (80 volume percent of the particles are equal or smaller than the given value) is preferably in the range of from 20 to 60 µm, with a $d_5$-value of 0.5 µm in combination with a $d_{80}$-value of 20 µm being most preferred.

In a second embodiment, the laser absorbing pigments used according to the present invention are based on substrates which bear a coating, according to a core/shell principle. Although either the substrate or the shell may be composed of niobium-doped titanium dioxide, it is preferred that the coating on the substrate contains the niobium-doped titanium dioxide, since in this case the material of the substrate may or may not, by itself, absorb laser rays as well. As substrate materials, silicatic materials such as natural or synthetic mica, talc or sericite, undoped or doped titanium dioxide, alumina, silica, carbon, graphite, iron oxide, barium sulfate or pearl pigments may be used. The doped titanium dioxide has a doping of Al, Si, Zr or Mn here. Mica and undoped titanium dioxide are preferably used as substrate materials since they are easily available and not expensive. Pigments according to the second embodiment usually exhibit the shape of the substrate material used. The substrate material may have for example a platelet shape, a fibrous shape, a spherical, spheroidal, lenticular or an irregular granular shape. A spherical, platelet or irregular granular shape is preferred, depending on the substrate material used. The particle size of pigments of this type may also be in the range of from 0.01 to 100 µm, in particular of from 0.05 to 80 µm, exhibiting $d_5$-values in the range of from 0.1 to 0.5 µm and $d_{80}$-values in the range of from 20 to 60 µm, as already disclosed above. A $d_5$-value of 0.5 µm in combination with a $d_{80}$-value of 20 µm is most preferred.

In case the layer is composed of the niobium-doped titanium dioxide, the layer and the core are present in a weight ratio of from 10:90 up to 99:1, relative to the weight of the entire pigment. Advantageously, the weight ratio layer:core of the pigment is in the range of 50:50 to 95:5, relative to the weight of the entire pigment.

In a third embodiment, the laser absorber pigments used according to the present invention are provided in form of pigment granules consisting of a mixture of niobium-doped titanium dioxide and of at least one further material which by itself may or may not absorb laser rays. Preferably, the at least one further material does also absorb laser rays. The at least one further material may be selected form the group carbon black, antimony, $TiO_2$, Al-, Si-, Zr-, Mn- or Sb-doped $TiO_2$, $Sb_2O_3$, mixed Sb/Sn oxides, Sb-, F-, or P-doped $SnO_2$, copper hydroxide phosphate, copper phosphate, magnetite, molybdenum sulfide, molybdenum oxide and/or BiOCl, whereby the antimony-free materials are preferred due to the object of the invention. The pigment granule consists of an intimate mixture of the niobium-doped titanium dioxide with the at least one further material. The pigment may exhibit any shape such as a spherical shape, a spheroidal shape, a lenticular shape, a sausage shape or an irregular shape. It goes without saying that the particle shapes may be slightly deformed due to the technical procedure by which they are formed. The particle size of the granule is in the range of from of from 0.01 to 100 µm, in particular of from 0.05 to 80 µm, exhibiting $d_5$-values in the range of from 0.1 to 0.5 µm and $d_{80}$-values in the range of from 20 to 60 µm. A $d_5$-value of 0.5 µm in combination with a $d_{80}$-value of 20 µm is most preferred.

In the second and third embodiment, the content of niobium-doped titanium dioxide in the laser absorbing pigment is at least 10% by weight, based on the weight of the entire pigment. Advantageously, the the content of niobium-doped titanium dioxide is 10 to 99% by weight, in particular 30 to 95% by weight, preferably 40 to 90% by weight and especially 50 to 80% by weight, based on the weight of the entire pigment, in order to assure the advantages of the niobium-doped titanium dioxide when the laser absorbing pigment is used in polymer compositions.

In all three embodiments described above, the percentage molar proportion of niobium in the niobium-doped titanium dioxide is in the range of from 0.05 to 15%, based on the molar mass of titanium. In particular, the percentage molar proportion of niobium is in the range of from 0.1 to 10%, especially of from 0.3 to 5%, based on the molar mass of titanium.

For the purposes of the present invention, the particle size is regarded as being the length of the longest axis of the pigments. The particle size can in principle be determined using any method for particle-size determination that is familiar to the person skilled in the art. The particle size determination can be carried out in a simple manner, depending on the size of the laser sensitive pigments, for example by direct observation and measurement of a number of individual particles in high-resolution light microscopes, but better in electron microscopes, such as the scanning electron microscope (SEM) or the high-resolution electron microscope (HRTEM), but also in the atomic force microscope (AFM), the latter in each case with appropriate image analysis software. The determination of the particle size can advantageously also be carried out using measuring instruments (for example Malvern Mastersizer 2000, APA200, Malvern Instruments Ltd., UK), which operate on the principle of laser diffraction. Using these measuring instruments, both the particle size and also the particle-size distribution in the volume can be determined from a pigment suspension in a standard method (SOP). The last-mentioned measurement method is preferred in accordance with the present invention.

The niobium-doped titanium dioxide used in the laser absorbing pigments according to the present invention may be produced as known in the art. To this end, a solution of a titanium compound and a solution of a niobium compound in deionised water are deposited in a vessel while setting the pH with the help of an an acid at a range of about 2.0. The solution is heated to and kept constant at a temperature of about 50 to 95° C. and the pH is kept constant by addition of a base over a period of about 0.5 to 5 hours. After the precipitation of the corresponding niobium-doped titanium dioxide hydrate, the resulting product is filtered, washed and dried. In order to convert the oxide hydrate into oxide, the dried product is calcined at a temperature in the range of from 500 to 1100° C. over a period of from 5 minutes to 5 hours. After calcination, the resulting product may be milled if required. The calcination may take place in an inert gas atmosphere or in a reducing gas atmosphere. It has surprisingly turned out that, if the niobium-doped titanium dioxide hydrate is calcined in a reducing atmosphere, the performance as a laser absorbing material is better than after the same product is calcined in an inert gas atmosphere. Without being bound to theory it is assumed that when the calcination is executed in a reducing atmosphere, some oxygen defects in the crystal lattice of titanium dioxide may be produced which enlarge the laser absorbing performance of the resulting niobium-doped titanium dioxide. Therefore, niobium-doped titanium dioxide which is subject to a calcination step under reducing conditions prior to the use as laser absorbing additive is preferred according to the present invention.

The calcination step may be carried out in an inert gas atmosphere such as $N_2$ or, advantageously, in a reducing $N_2/H_2$ gaseous atmosphere as generally known in the art as reducing gas atmosphere.

As raw materials, inorganic water soluble raw materials are preferred. For instance, the titanium raw material may be $TiCl_4$, $TiCl_3$, $TiOSO_4$ or peroxotitanate. As niobium raw material, e.g. $NbCl_5$, $Nb_2O_5$, $NbO$ or peroxoniobate may be used. For the production of an alkaline solution, NaOH or $Na_2CO_3$ may be used. As acid, usually HCl is used. It goes without saying that other appropriate raw materials might be used as well. Water soluble inorganic materials are preferred in order to be able to execute the production process in an inexpensive and easily to handle aqueous medium.

The production of pigments containing a niobium-doped titanium dioxide layer on a substrate particle may be executed for example as described in U.S. Pat. No. 5,945,035. Here as well, a final calcination step under reducing conditions enhances the laser absorption property of the resulting pigments.

Through the addition of the laser absorbing pigments according to the invention as additives to the polymer composition, in particular in concentrations of 0.001 to 20% by weight, preferably 0.01 to 10% by weight and very particularly preferred 0.05 to 3% by weight, based on the, preferably organic, polymer composition contained in the article to be marked which is produced by means of the polymer composition, a high contrast is achieved in a dark bluish or blackish laser marking on the surface of articles which is comparably closer to pure black in color than laser markings made by using the commercially available absorbers at comparable concentrations. In addition, the laser absorbing additive itself does not comprise substances which might be disadvantageous for environment and health of people and are, in addition, of good heat resistivity, the latter being important if the corresponding articles produced are exposed to high temperatures at any point of production and/or use thereof. The said concentrations are not solely dependent on the desired contrast, but also on the layer thickness of the use medium. Thus, significantly higher concentrations are necessary in print and coating applications than in plastic bodies in order to provide the laser beam with a sufficient number of pigment particles.

The concentration of the laser pigment according to the invention in polymers or in polymer systems, preferably in thermoplastics, thermosets or elastomers, is, however, also dependent on the polymer material employed. The low proportion of laser pigment changes the polymer system insignificantly and does not affect its processability. It is a remarkable advantage of the present invention that merely low concentrations of the niobium-doped titanium dioxide additive are necessary in order to achieve contrastful laser markings of good quality, sharpness and dark blackish colour in the goods produced therewith.

Furthermore, besides the laser absorbing additives, colorants can be added to the polymers, allowing colour variations of all types and at the same time ensuring retention of the laser marking. Suitable colorants are, in particular, coloured metal-oxide pigments and coloured organic pigments and dyes which do not decompose during the laser marking and do not react under laser light.

Optionally, fillers and other additives of any kind which are usually used in polymer compositions might be present in combination with or alternatively to colorants in the polymer composition having incorporated the laser absorbing additives as described above. Suitable fillers and additives are, for example, flame retardants, antioxidants, light stabilizers, process aids, inorganic fillers, etc.

Suitable polymer materials for the polymer composition of the present invention are all known polymers, especially those which do not absorb laser rays to the required extent for marking, in particular thermoplastics, furthermore also thermosets and elastomers, as described, for example, in Ullmann, Vol. 15, pp. 457 ff., Verlag VCH. Suitable polymers are, for example, polyethylene, polypropylene, polyamides, polyesters, polyester-esters, polyether-esters, polyphenylene ether, polyacetal, polyurethane, polybutylene terephthalate (PBT), polymethyl methacrylate, polyvinyl acetal, polystyrene, acrylonitrile-butadiene-styrene (ABS), acrylonitrile-styrene-acrylate (ASA), polycarbonate, polyether sulfones and polyether ketones, and copolymers, mixtures and/or polymer blends thereof, such as, for example, PC/ABS, MABS.

Suitable thermosetting polymers are, for example, polyurethane, melamine resins, epoxy resins and particular polyester resins.

Silicone resins and polysiloxanes are useful as well.

The laser pigment used according to the present invention is incorporated into the polymer composition being the starting material for the desired article to be marked, which is preferably a shaped plastic article or a plastic film, or a corpus of any material comprising a solidified polymer coating on its surface, for example a solidified paint or paper coating, or a powder coating, a solidified automobile paint or printing ink, etc., by mixing the polymer granules, the coating composition or the printing ink with the laser pigment and optionally deforming the mixture under the action of heat. The laser pigment can be added to the polymer composition simultaneously or successively. Adhesives, organic polymer-compatible solvents, stabilisers and/or surfactants which are temperature-stable under the working conditions can optionally be added to the polymer composition, preferably plastic granules, during incorporation of the laser pigment.

The incorporation of the niobium-doped titanium dioxide into plastic granules can take place, for example, by compounding, via a masterbatch, via pastes or by direct addition during the shaping processing step (direct pigmentation). One or more additives, such as, for example, those selected from the group of processing aids, antioxidants, lubricants, stabilisers, flame retardants, fillers and colour-imparting pigments, can optionally be added to the starting polymer, preferably also in the form of plastic granules, during the incorporation of the absorber. The laboratory preparation of the doped plastic granules is generally carried out by initially introducing the plastic granules in a suitable mixer, wetting them with one or more dispersion aids and then adding and incorporating the absorber and the coloured pigments required. In industrial practice, the colouring of the polymer composition and the addition of additives to the polymer composition is usually carried out via a colour concentrate (masterbatch) or compound. For this purpose, coloured pigments and additives are dispersed in the molten plastic with high shear in extruders (usually co-rotating twin-screw extruders). The plastic melt exits through a perforated plate on the extruder head and is converted into granules by means of suitable downstream devices (for example strand pelletising processes or underwater granulation). The granules thus obtained can be further processed directly in an extruder or injection moulding machine. The mouldings formed during the processing exhibit very homogeneous distribution of the absorber. Subsequently, the laser marking is carried out using a suitable laser.

In case the polymer material of the polymer composition is a polymer binder and the polymer composition is a coating composition or a printing ink, the niobium-doped titanium dioxide containing laser additive of the present invention may simply be mixed with the corresponding polymer binder and, optionally, with solvents and/or other additives and fillers which are usually used in coating and printing systems.

The present invention, in a second aspect, does also relate to a polymer composition which comprises at least one polymer compound and a laser absorber, where the laser absorber comprises pigments which comprise niobium-doped titanium dioxide. The at least one polymer compound is selected from the group as described above. Polymer mixtures and/or copolymers thereof are often used as well. The polymer composition according to the present invention may comprise, besides the niobium-doped titanium dioxide containing pigments as laser absorber, further additives and/or fillers which are usually used in polymer compositions as already described above. Optionally, solvents may be present as well. The polymer compounds for the polymer composition according to the present invention are thermoplastic, thermosetting or elastomer materials.

The laser absorbing pigment which comprises niobium-doped titanium dioxide is present in the polymer composition in a proportion of 0.001 to 20% by weight, preferably 0.01 to 10% by weight and very particularly preferably 0.05 to 3% by weight, based on the weight of the polymer composition. It is a great advantage of the present invention that even merely small amounts of laser absorbing pigment can lead to very sharp, contrastful dark markings in the resulting article composed of or containing the polymer composition according to the present invention.

In a third aspect, the present invention does also relate to a laser markable or laser weldable article, whereby the article consists of a corpus having a surface, and where the corpus or at least the surface thereof is composed of a polymer composition as described above. The corpus may have any shape and is, by itself, a part of an object of interest or the object itself, i.e. the desired good. The corpus may be composed of any polymer material, of the polymer composition containing the niobium-doped titanium dioxide laser absorbing additive according to the present invention, of metal, wood, paper, cardboard or the like, as long as at least the surface of the corpus is composed of or comprises the polymer composition containing the niobium-doped titanium dioxide laser absorbing additive according to the present invention and as long as the corpus material can stand the temperature of the laser action required to produce the requested laser marking. Said article is, due to the content of the laser marking additive pigments used in the present invention, laser markable and/or laser weldable, as the case may be. To this end, a laser marking is advantageously present at least on the surface of the article. The corresponding laser marking is a sharp blackish or dark bluish marking with high contrast on a light or colored surface of the article. Its darkness does, inter alia, depend on the actual concentration of the laser absorbing pigment in the polymer composition as well as, to some extent, on the laser apparatus used.

Besides the excellent optical properties, contrast and edge sharpness, the finely divided niobium-doped titanium dioxide pigments in the polymer composition and, accordingly, in the laser markable and/or laser weldable article according to the present invention allow rapid marking and welding and provide a large processing window based on the laser settings.

The inscription of the article comprising the polymer composition according to the present invention using a laser is carried out by bringing the specimen into the ray path of a pulsed laser, preferably an Nd:YAG laser, YVO$_4$ laser or 1064 nm fibre laser. Furthermore, inscription using an excimer laser, for example via a masking technique, is possible. However, the desired results can also be achieved using other conventional types of laser which have a wavelength in a region of high absorption of the pigment used. The marking obtained is determined by the irradiation time (or pulse count in the case of pulsed lasers) and irradiation power of the laser and also by the polymer system used. The power of the laser used depends on the particular application and can readily be determined by the person skilled in the art on a case by case basis.

The lasers used generally have a wavelength in the range from 100 nm to 32 μm, preferably in the range from 355 nm to 10.9 μm and most preferably in the range from 800 nm to 1200 nm. Mention may be made here, for example, of CO$_2$ lasers (about 10.6 μm), Nd:YAG lasers (about 1064 nm), YVO$_4$ lasers (about 1064 nm), fibre lasers (about 1062 nm), green lasers (532 nm), UV lasers (355 nm) or semiconductor diode lasers (405-3330 nm). The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm) and XeF excimer laser (351 nm).

Most preferably the laser is a pulsed near infrared laser with a wavelength of about 1064 nm. The fibre laser, the YAG laser and the YVO4 laser belong to this class of lasers. The laser shall be pulsed with a pulse duration ranging from nano to femto seconds. Corresponding lasers which can be used in the process according to the invention are commercially available.

The laser welding is carried out by welding a laser-transparent material to a laser-absorbing material. For the purpose of laser welding, as laser-absorbing material, the niobium-doped titanium dioxide containing pigments can be added in concentrations of 0.001 to 10% by weight, preferably 0.001 to 7% by weight and in particular 0.01 to 3% by weight, based on the polymer composition. Suitable lasers for laser welding are preferably CW diode lasers or Nd:YAG lasers at wavelengths of 800-1100 nm, preferably 808-1080 nm.

The polymer composition which comprises the niobium-doped titanium dioxide pigments in accordance with the present invention can be used in all fields where conventional welding processes or printing processes have hitherto been used for the inscription or joining of plastics. For example, moulding compositions, semi-finished products and finished parts made from or containing the polymer composition according to the invention can be used in the electrical, electronics and automotive industry. The labelling and inscription of, for example, cables, pipes, decorative strips or functional parts in the heating, ventilation and cooling sector or switches, plugs, levers and handles which consist of the polymer composition comprising the laser absorbing additive in accordance with the invention can be carried out with the aid of laser light even in places that are difficult to access. Furthermore, the polymer composition according to the present invention can be used in packaging in the food sector or in the toy sector. Almost every article that can be manufactured by using the polymer composition of the present invention for producing a coating layer or printed ink layer on the surface thereof may also be manufactured and provided with a laser marking. This belongs especially to security and identification applications (credit cards, identification plates, labels) or advertising applications (logos, decorative elements, promotional articles). The markings on the packaging, security or advertising products are distinguished by the fact that they are longlasting and wipe- and scratch-resistant. For packaging applications, it is further advantageous that they are also stable during subsequent sterilisation processes and can be applied in a hygienically pure manner during the marking process. Complete label images can be applied permanently to the packaging for a reusable system. Furthermore, the polymer composition according to the present invention may be used in medical technology, for example in the marking von Petri dishes, microtitre plates, disposable syringes, ampoules, sample containers, supply tubes and medical collecting bags or storage bags.

A further important area of application for laser inscription are plastic tags for the individual labelling of animals, so-called cattle tags or ear tags. A barcode system is used to store the information which specifically belongs to the animal. This can be read off as required with the aid of a scanner. The inscription has to be very durable since the tags sometimes remain on the animals for a number of years.

The laser marking of moulding compositions, semi-finished products and finished parts which consist of the polymer composition according to the invention or of articles which comprise the latter at least on the surface thereof is thus possible.

The use of the niobium-doped titanium dioxide containing pigments as laser additives in polymer compositions according to the present invention allows the creation of contrastful dark markings which do not exhibit a brownish tinge but are dark blackish to bluish markings desired in the market, while the resulting articles need not to contain antimony which might be harmful for environment and health of people. In addition, the content of very small amounts of the laser additive pigment according to the present invention allows rapid marking with high pulse rates and provides a large processing window based on the laser settings.

The examples below are intended to explain the invention, but without limiting it. The percentages indicated are percent by weight.

EXAMPLE 1

A solution of 2.8 g of $NbCl_5$ powder in 125 ml of HCl (37%) is added to 474 ml of a 400 g/l $TiCl_4$ solution in deionized water. The resulting mixture is added into 1600 ml of deionized water while keeping the pH controlled at a value of 1.8 at a temperature of about 75° C. for three hours. Thereafter, the solids are filtered, washed and dried in an oven at 105° C. for ten hours. The dried sample is filled in a crucible and calcined at 700° C. under $N_2/H_2$ (96%/4%) for 15 min. A pigment containing 1.00 mol % Nb relative to the mol mass of Ti is achieved.

EXAMPLES 2 to 4

Example 1 is repeated with the amendment that the amounts of $NbCl_5$ and HCl are adapted in order to achieve a pigment having a content of 0.05 mol % Nb in example 2 (0.14 g $NbCl_5$, 6 ml HCl), 4.00 mol % Nb in example 3 (11.0 g $NbCl_5$, 499 ml HCl) and 10.00 mol % Nb in example 4 (28 g $NbCl_5$, 1247 ml HCl), respectively, in each case relative to the mol mass of Ti.

COMPARATIVE EXAMPLE 1

Example 1 is repeated with the amendment that a solution of $NbCl_5$ in HCl is not used, but the $TiCl_4$ solution is solely added to the deionized water at a pH of 1.8 and further prosecuted as described above. A $TiO_2$ containing pigment without any Nb content is thus obtained.

Evaluation of Laser Marking Properties

Plastic plates having a size of 74×147 mm are produced by molding at 180° C. a polymer composition consisting of a mixture of a low density polyethylene (LDPE, product of Japan Polyethylene Corporation) and of a dry powder, the latter being composed of the pigment according to examples 1-4 as well as of the pigment of comparative example 1, and zinc stearate powder, in a weight ratio 8:2 (sample/zinc stearate), resulting in a content of the niobium-doped titanium dioxide pigment or alternatively, the titanium dioxide pigment of 0.3% by weight, based on the weight of the whole polymer composition, in the LDPE.

A further comparative sample (comp. ex. 2) is prepared, using Iriotec® 8825 (laser pigment of Merck KGaA, antimony-doped tin oxide on mica substrate) as laser absorbing pigment instead of niobium-doped titanium dioxide. The content thereof in the test plate is 0.3 weight % as well, based on the weight of the whole polymer composition.

The plastic plates are irradiated by a 1064 nm fiber laser (LP-V10U of Panasonic sunx) under standard conditions to form a test grid.
Maximum output: 15 W
Pulse frequence: 10-50 µs

| | Laser marking property | | |
|---|---|---|---|
| | Marking darkness | reactivity | color |
| Comparative example 1 | average | average | grey |
| Comparative example 2 | good | good | brown |
| Example 1 | excellent | excellent | bluish black |
| Example 2 | good | good | bluish black |
| Example 3 | excellent | excellent | bluish black |
| Example 4 | excellent | excellent | bluish black |

Irradiation of the plastic plates by a 10.5 W vanadate laser (Trumpf VectorMark 5) at 99% power, speed 500-5000 mm/s, pulse 20-100 KHz and 50 µm line distance gives similar results by evaluation of the resulting test grids.

EXAMPLES 5-8

Examples 1 to 4 are repeated with the proviso that the final calcination of the pigment is executed in an $N_2$ atmosphere at 800° C.

COMPARATIVE EXAMPLE 3

Comparative example 1 is repeated with the proviso that the final calcination of the pigment is executed in an $N_2$ atmosphere at 800° C.

The evaluation of the laser marking properties of examples 5-8 and comparative example 3 after irradiation with a 1064 nm fiber laser takes place in the same manner as described above for examples 1-4 and comparative examples 1 and 2.

| | Laser marking property | | |
|---|---|---|---|
| | Marking darkness | reactivity | color |
| Comparative example 3 | poor | poor | grey |
| Example 5 | good | good | bluish black |
| Example 6 | average | average | bluish black |
| Example 7 | good | good | bluish black |
| Example 8 | good | good | bluish black |

Here as well, irradiation by a 10.5 W vanadate laser (Trumpf VectorMark 5) at 99% power, speed 500-5000 mm/s, pulse 20-100 KHz and 50 µm line distance gives similar results by evaluation of the resulting test grids.

Evaluation of Coloristic Properties of Markings and Test Plates

In order to be able to compare the coloristic data achieved by the use of the niobium-doped titanium dioxide containing pigment as laser additive in the present invention with the prior art, it is reasonable to determine the lightness value L* of the marking itself (must be as low as possible for obtaining dark markings) as well as the transparency of the test plastic plate (the higher the transparency, the better the opportunity to color the plastic material in the desired color). In addition, the coloristic data (L*, a, b) of the test plate containing the laser additive should be as neutral as possible making sure that the content of the laser additive pigment does not hamper the neutral color of the test plate itself. The colorimetric measurement is performed on a block of 50 mm×30 mm marked with 10.5 W vanadate laser (Trumpf VectorMark 5), 99% power, speed 3000 mm/s, frequency 80 Hz, line distance 50 µm (alternating mode). The colorimetric evaluation is performed with a Minolta Chroma Meter CR-300.

The following results are achieved:

| Material | comp. 1 | comp. 2 | ex. 1 |
|---|---|---|---|
| Concentration Nb (mol %) | 0 | 0 | 1.0 |
| L-value laser marking | 56.4 | 47.2 | 42.2 |
| L-value test plate on white background | 78.8 | 72.7 | 71.8 |
| a-value test plate | −1.4 | −0.3 | −1.6 |
| b-value test plate | −0.8 | 2.2 | −4.0 |
| L-value test plate on black blackground | 69.9 | 52.7 | 57.3 |
| Transparency (calculated in %) | 11.3 | 27.5 | 20.2 |

Transparency of the test plate is calculated as follows:

$$\text{Transparency} = [L^*\text{value(white background)} - L^*\text{-value (black background)}]/L\text{-value(white background)} \times 100\%$$

The test plate of example 1 exhibits a light color with high L*-values, indicating that the niobium-doped titanium dioxide in the plate content does not diminish the lightness of the plate significantly more than the comparative laser additive Iriotec®8825 (comp. ex. 2). In particular the b-value of the test plate indicates that the use of the laser additive pigments according to the present invention leads to a slight bluish color not only of the marking itself, but also of the test plate, which is more tolerable than the slight yellowish color of the test plate of comp. ex. 2.

In addition, the laser marking of example 1 itself exhibits a lower L*-value than that of comp. ex. 2, indicating a darker color of the marking which is dark bluish-black instead of dark brown for comp. ex. 2. Although the absolute transparency of the test plate for comp. ex. 2 is not achieved, the test plate of example 1, corresponding to an article composed of the polymer composition according to the present invention, shows a transparency sufficiently high in order to allow coloration in all colors desired by the applicant of the newly presented laser absorbing additive.

EXAMPLE 9—LASER WELDING

A plastic plate corresponding to the plastic plate of example 3 is used in order to check the laser welding performance. Said plastic plate is used for the laser absorbing bottom layer of the welded element. The top layer consists of a laser transparent plate of the same polyethylene material as used for the plate of example 3 but without additives. The laser transparent plate has the same size as the laser absorbing bottom layer plate and was produced under the same conditions on the injection moulding machine prior to the use thereof. For testing the laser welding performance, the 10.5 W vanadate laser (Trumpf VectorMark 5) is used in continuous wave mode (unpulsed). The laser beam is set up in a way that the focus lies 4 mm under the surface of the laser absorbing bottom layer plate which contains the niobium-doped titanium dioxide. The laser transparent plate is put in close contact to the laser absorbing bottom layer plate on top of the latter and is fixed at the edges by means of magnets. The maximum laser power of 100% is used and the speed of the laser beam is set to 20 mm/s. 1000 parallel lines with a length of 1 mm and a distance of 50 μm are lasered. With a progress of 1 mm/s a welding line is formed. The welding line is well defined and both plates are strongly bond to each other.

The invention claimed is:

1. A process for laser marking of an article, comprising exposing to laser radiation an article containing a pigment comprising a niobium-doped titanium dioxide laser absorbing additive in a polymer composition, the percentage molar proportion of niobium being 0.3 to 15% based on the molar mass of titanium, the polymer composition comprising polyethylene, polypropylene, a polyamide, a polyester, a polyester-ester, a polyether-ester, polyphenylene ether, polyacetal, polyurethane, polybutylene terephthalate, polymethyl methacrylate, polyvinyl acetal, polystyrene, acrylonitrile-butadiene-styrene, acrylonitrile-styrene-acrylate, polycarbonate, a polyether sulfone, a polyether ketone, or polymer blends or copolymers thereof, a melamine resin, an epoxy resin, a silicone resin or a polysiloxane, wherein the niobium-doped titanium dioxide is subjected to calcination under reducing conditions in an $N_2/H_2$ atmosphere prior to use as a laser absorbing additive.

2. The process according to claim 1, wherein the pigment consists of the niobium-doped titanium dioxide.

3. The process according to claim 1, wherein the pigment comprises a substrate and a coating located thereon, and the niobium-doped titanium dioxide is present in the coating.

4. The process according to claim 3, wherein the substrate is natural mica, synthetic mica, talc, sericite, titanium dioxide, titanium dioxide doped with Al, Si, Zr or Mn, alumina, silica, carbon, graphite, iron oxide, barium sulfate and/or a pearl pigment and has a coating which comprises niobium-doped titanium dioxide.

5. The process according to claim 1, wherein the pigment has a particle size in the range of from 0.01 to 100 μm.

6. The process according to claim 1, wherein the pigment is present in the polymer composition in a proportion in the range of from 0.001 to 20% by weight, based on the total weight of the polymer composition.

7. The process according to claim 1, wherein the polymer composition comprises at least one polymer compound and the laser absorbing additive, and optionally solvents, fillers, additives and/or colorants.

8. The process according to claim 1, wherein the polymer compound is a thermoset that is a polyurethane, a melamine resin, an epoxy resin or a polyester resin.

9. A polymer composition, comprising at least one polymer compound that is polyethylene, polypropylene, a polyamide, a polyester, a polyester-ester, a polyether-ester, polyphenylene ether, polyacetal, polyurethane, polybutylene terephthalate, polymethyl methacrylate, polyvinyl acetal, polystyrene, acrylonitrile-butadiene-styrene, acrylonitrile-styrene-acrylate, polycarbonate, a polyether sulfone, a polyether ketone, or polymer blends or copolymers thereof, a melamine resin, an epoxy resin, a silicone resin or a polysiloxane, and a laser absorbing additive, in a proportion of 0.001 to 20% by weight, based on the total weight of the polymer composition, where the laser absorbing additive is a pigment consisting of titanium dioxide which is doped with niobium and is subject to calcination under reducing conditions in an $N_2/H_2$ atmosphere, prior to use as a laser absorbing additive, where the percentage molar proportion of niobium is 0.3 to 15%, based on the molar mass of titanium.

10. The polymer composition according to claim 9, wherein the polymer compound is a thermoset that is a polyurethane, a melamine resin, an epoxy resin or a polyester resin.

11. A laser markable and/or laser-weldable article consisting of a corpus having a surface, wherein the corpus or at least a part of the surface thereof is composed of or comprises a polymer composition according to claim 9.

12. The laser markable and/or laser weldable article according to claim 11, wherein the corpus has a laser marking on the surface.

* * * * *